United States Patent [19]

Browning et al.

[11] Patent Number: 5,191,873
[45] Date of Patent: Mar. 9, 1993

[54] USEFUL IMPROVEMENTS IN SAWING DEVICES

[76] Inventors: Robert E. Browning, 168 Northfield St., Montpelier, Vt. 05602; R. McKim Browning, Carpenter Hill Rd., Alfred, Me. 04002

[21] Appl. No.: 840,120

[22] Filed: Feb. 24, 1992

[51] Int. Cl.[5] .......................... B24D 5/12; B24D 5/06
[52] U.S. Cl. ..................... 125/15; 51/206.5; 83/839; 83/844; 125/22
[58] Field of Search .................. 125/22, 15, 13.01, 12; 51/206.5, 206.4; 407/51, 52, 49; 83/844, 840, 839, 838

[56] References Cited

U.S. PATENT DOCUMENTS

| 4,484,560 | 11/1984 | Tanigawa | 125/15 |
| 4,744,278 | 5/1988 | Wright | 407/51 |

FOREIGN PATENT DOCUMENTS

| 0167770 | 8/1985 | Japan | 125/15 |
| 0381545 | 8/1973 | U.S.S.R. | 125/22 |
| 0000913 | of 1855 | United Kingdom | 125/13.01 |

Primary Examiner—Robert A. Rose
Attorney, Agent, or Firm—William G. Rhines

[57] ABSTRACT

This invention relates to devices for sawing hard material such as stone, and includes extenders to be affixed to the peripheral surfaces of a sawing core. Each has vertical sidewalls which are spaced-apart from each other by top and bottom spacer elements. The cavity created thereby opens to the front (i.e., in the direction of travel of the core when in use) and to the rear of the extender. The bottom of the cavity, which is formed by the upper surface of the bottom spacer element, inclines upward toward the rear to deflect water that has been sprayed onto the device to lubricate, cool and clean it, onto the next succeeding extenders and their associated cutting surfaces. The top spacer element receives a slideably replaceable cutting member base from said front direction, that may have a U-shaped mounting base and has a matrix element affixed to its top that is adapted to provide desired cutting surfaces. Preferably, the top and front surfaces of each cutting member base covers the top ends of the side walls of the extender to which is affixed. Each extender may include a tab which extends into spaces on the peripheral surface of the core, which may abut a surface of that space to assist in preventing the extender from becoming dislodged.

20 Claims, 3 Drawing Sheets

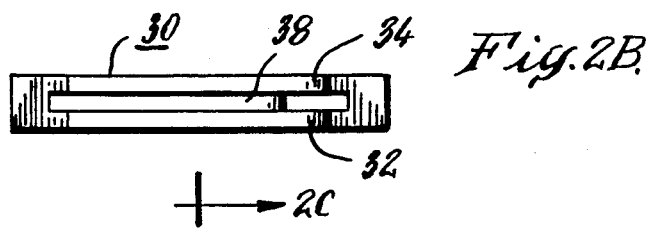
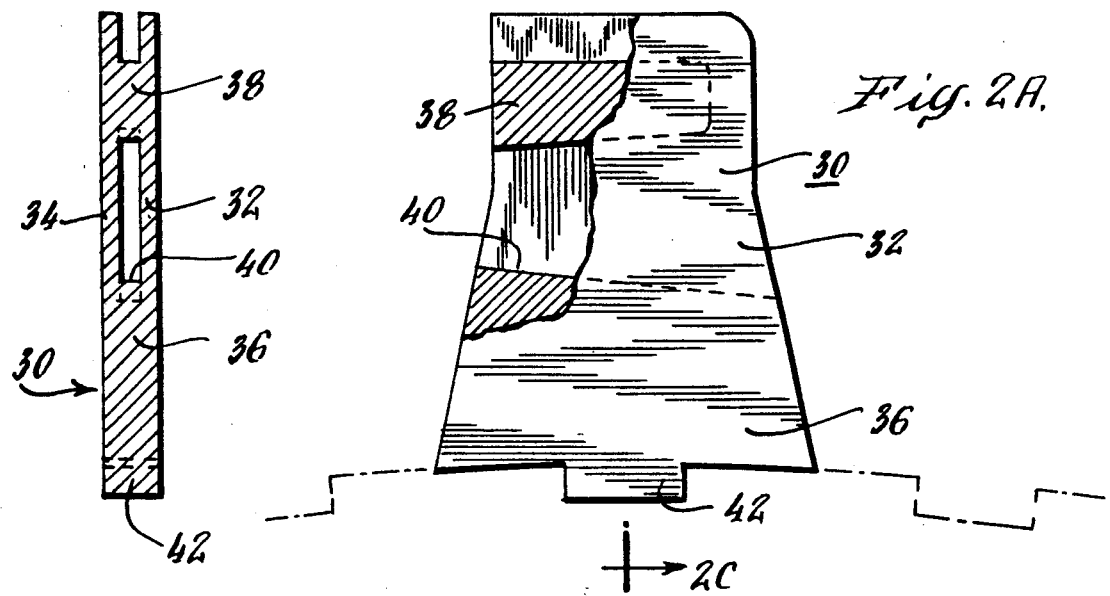
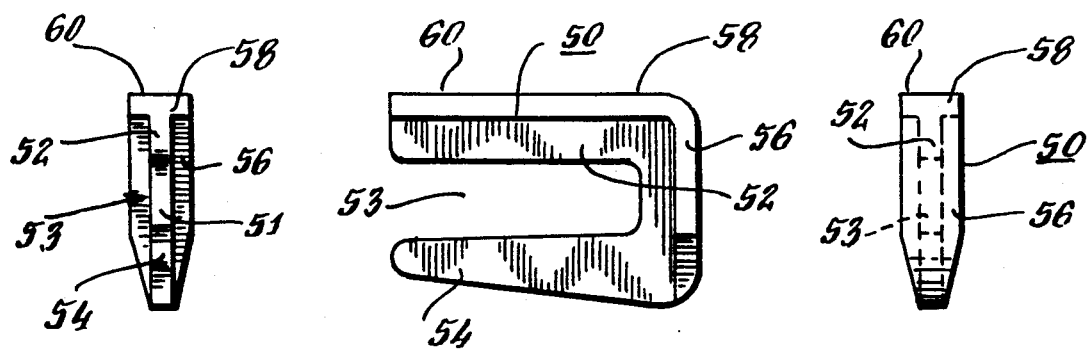

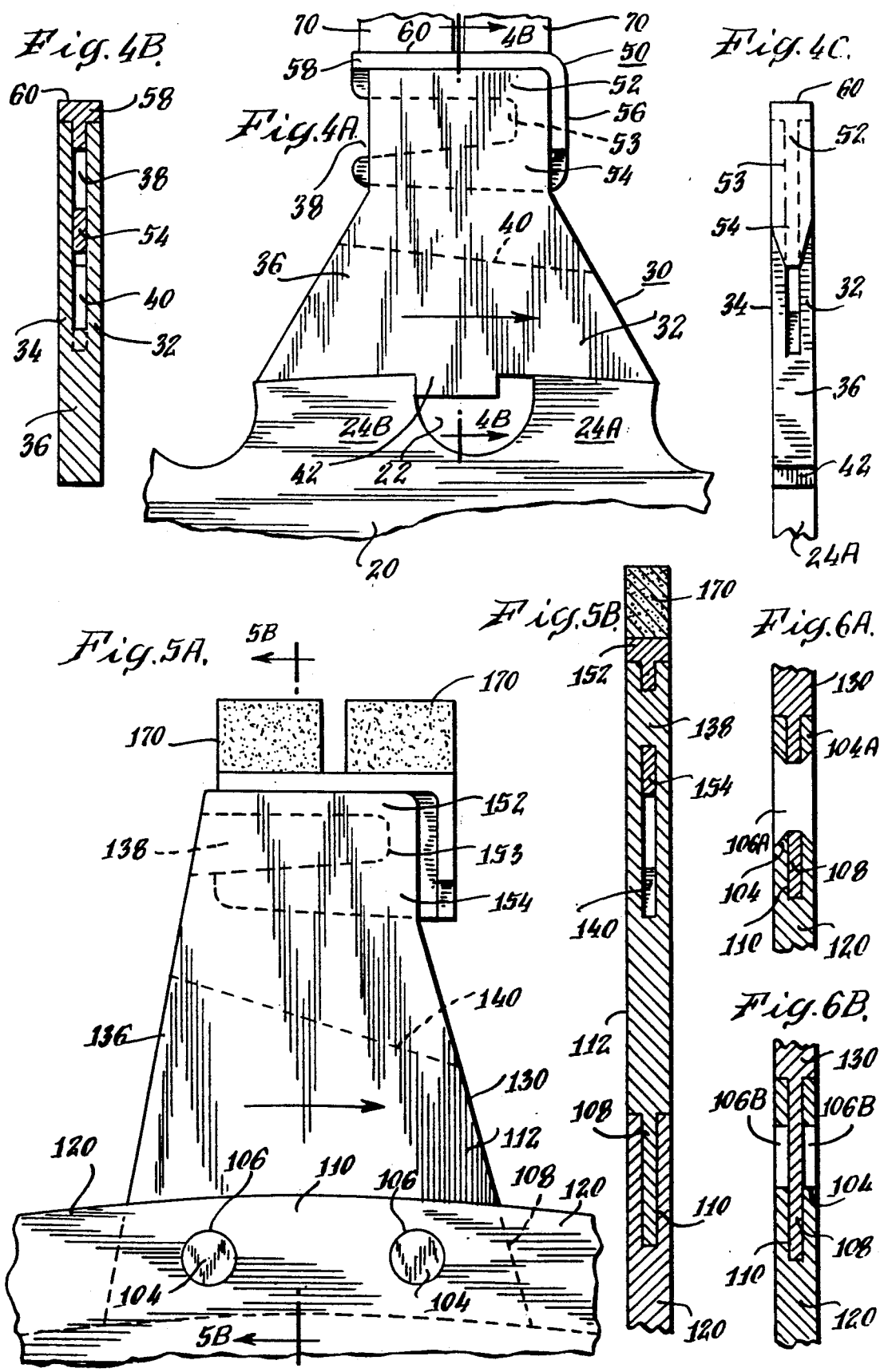

USEFUL IMPROVEMENTS IN SAWING DEVICES

BACKGROUND OF INVENTION

In the field of cutting devices, circular saws are known for the purpose of cutting slabs and other shapes from blocks or other masses of material such as stone. Since such material inherently is relatively hard, the basic technology employed is different from that used in cutting other materials, such as wood, composition board, paper, or the like, where incisor, severing, shearing, or chipping actions, are adequate. These usually are of little or no practical use with such hard materials. Instead, abrasion of the material being cut, by diamond or other material which is harder and therefore less prone to wear relatively, is frequently used. Thus, circular saws used to cut stone such as granite typically include cutting surfaces in which strong matrix material, such as cobalt or other metal, is provided with pieces of diamond substantially permanently affixed imbedded, encased, or otherwise retained so as to be available at the surface of the matrix to do the actual cutting.

However, particularly in the field of stone cutting, and especially with hard granite and other hard stone materials, there is interest in improving the efficiency, speed, cost effectiveness, and durability of such cutting devices. Normally, they are made from materials such as tungsten carbide, cobalt, bronze, and diamonds, and are costly and difficult to fabricate and tend to operate relatively slowly and to deteriorate rapidly. Further, when deterioration does occur from use, it is difficult, time consuming and costly to correct, often involving the complete removal, reconditioning, resurfacing, and/or other renovation of the blade and/or its cutting surfaces. In addition, increases in the diameter of such blades in order to increase the cutting depth and production rates are accompanied by increases in prices which are disproportionately larger than the corresponding diameter increases, apparently due to manufacturing and/or technical difficulties, market forces, or other operative factors.

Various attempts have been made to address these problems. A current approach is to replace permanent cutting surface material with segments affixed to the circumferential surfaces of the core by means of brazing, welding, adhesives, silver soldering, epoxy or other bonding means. The cutting surfaces of such segments would be made by using embedding, encasing, molding or other means to incorporate diamond particles into a matrix of cast, sintered, pressed or powdered metal, resin or plastic. Usually, the matrix is made from metals such as bronze, cobalt, nickel, tungsten or other material that is susceptible to being bonded by sintering. In this connection, reference is made to Lindblad U.S. Pat. No. 3146561. However, the prior art also demonstrates that retaining such segments in place is a difficult problem, requiring special considerations and imposing particular limitations.

It is known to provide cutting materials in the form of matrix or machined steel inserts for removable affixation in the gullets at the periphery of a circular saw blade core. But such materials inherently are either brittle, or too pliable, and consequently too weak and susceptible to cracking, breaking and otherwise fracturing. Even the basic task of mounting such inserts requires special accommodations to compensate for their comparatively poor structural integrity. In this connection, reference is made to Cofran U.S. Pat. No. 3307242. These same characteristics also limit the physical stresses to which such materials may be exposed in use. Thus, they may limit cutting speeds and pressures, particularly in the context of uses such as cutting stone and other comparatively hard materials.

A related concern is with being able to adapt a circular "center", "disc" or "core" for use effectively in the same manner as would be a large diameter core. In the context of this invention, these terms are intended to be synonymous and to convey the meaning usually attributed to them but, as well, to include saw blades, new or used, albeit normally absent their cutting surfaces. The desirability of being able to do this is reflected in a comparison of the prices currently being charged for circular stone saw blades with diamond cutting surfaces. For example, in 1991, a common diameter core was about 10 ft. which sold for about $13,000, while a core about 11.5 ft. in diameter sold for about $26,000. The disproportionate amount of this increase apparently is a result of several factors, possibly including the more extreme technical difficulties encountered in manufacturing them, the equipment involved, and their greater tendency toward misalignment and vibrating. There are some applications where increased blade diameter is the most practical approach to perform the desired kind of work, as in the matter of cutting larger dimension slabs. Since merely extending the diameter of the cutting surface support, as by adding to the height of the teeth (e.g.), runs afoul of the brittleness and stability limitations referred to above, that expedient alone hasn't yet sufficed.

Some of the special problems attendant to cutting stone and other hard materials are apparent from other prior art references. They reveal that there have been attempts to accommodate the extensive wear usually experienced in such applications by the use of structures which render replacement of the abrading surfaces easier. Some of them have involved brazing, riveting, bolting, or otherwise permanently affixing saw tooth mounts on which abrasive surfaced matrixes might be positioned to the gullet-separated "lands" which, on traditional saw blade cores, become the bases to which are affixed the abrasion impregnated matrixes that do the actual cutting and thus are designated the "teeth". But this, in turn, introduces other difficulties. The abrasive matrixes must be stable positionally, requiring that they have a tight fit when in place. But they also must be adapted to easy removal and affixation, which ordinarily compromises such positional stability, and the inherent brittleness of such abrasive matrixes tends to limit the amount of mechanical stress which they can tolerate. Attempts to circumvent this by using such affixation techniques as brazing or welding the mounts to the core are time consuming and expensive. Further, over the long term, they can derogate the core severely, since repeated and uneven heating tends to introduce internal stress discontinuities and other adverse physical effects which, in turn, produce objectionable misalignments and other undesired ramifications. In an attempt to circumvent this, special mounting techniques have been proposed. In this connection, reference is made to deKok U.S. Pat. Nos. 4641628 and 4517954, and Tanigawa U.S. Pat. No. 4484560. Such proposals, however, do not accommodate themselves to the concurrent objectives of ease of removal of cutting surfaces while maintaining strength and positional stability, of longevity, of increasing the area of cutting surfaces, of improved cooling and cleaning of the cutting surfaces, of increased cutting rates, or of adapting less expensive cores to desired diameter increases.

Accordingly, it is an object of this invention to provide improved means for cutting hard materials.

It is another object of this invention to provide such means in a form wherein the cutting surfaces may be readily installed.

Still another object of this invention is to provide means for achieving one or more of the foregoing objectives wherein the cutting surfaces may be easily removed.

Yet another object of this invention is to provide means for achieving one or more of the foregoing objectives wherein the cutting surfaces may be easily replaced.

Another object of this invention is to provide means for achieving one or more of the foregoing objectives wherein the effective radius of the cutting device may be increased.

Still another object of this invention is to provide means for achieving one or more of the foregoing objectives wherein cooling of the cutting surfaces may be enhanced.

Yet another object of this invention is to provide means for achieving one or more of the foregoing objectives wherein the debris removal from the cutting surfaces is enhanced.

Another object of this invention is to provide means for achieving one or more of the foregoing objectives wherein the cutting surfaces positionally are more stable.

Still another object of this invention is to provide means for achieving one or more of the foregoing objectives wherein straighter and cleaner saw cuts are attainable.

STATEMENT OF INVENTION

Desired objectives may be achieved through practice of this invention, embodiments of each of which include an extender and a cutting member. The direction of travel of the core when in use being taken as the "front", the extender is adapted for affixation to the periphery of an associated circular saw blade or other core, and comprises spaced-apart sidewalls, wherein the space between them opens front and rear and has a floor which inclines upward toward the rear. The top regions of the sidewalls are joined by a separator element which is adapted to serve as a mount for a cutting member to be removeably affixed thereto, as by the cutting member having a long, open ended receiving slot which may be positioned on the mount member with the slot open opens toward the rear of the extender and being so configured and dimensioned with respect to the separated element as to stabilize the cutting member positionally when it is so positioned thereon. The top surface of the cutting member includes components which expose abrasive cutting material and preferably extends over the tops of the side walls of the extender. The extender may include reinforcing means to enhance the integrity of its affixation to its associated core.

DESCRIPTION OF DRAWINGS

This invention may be understood from this Specification and its accompanying claims, and from the accompanying drawings in which FIGS. 2A, 2B and 2C are, respectively, a side elevation view, a top view, and a front cross-sectional view of an extender embodying this invention, FIGS. 3A, 3B, and 3C are, respectively, a side view, a rear view, and a front view a cutting member embodying this invention, FIGS. 4A, 4B and 4C are, respectively, side, front and rear cross-sectional views of the embodiments of this invention shown in FIGS. 2A through 3D inclusive, FIGS. 5A and 5B are, respectively, side and rear cross-sectional views of another embodiment of this invention, and FIGS. 6A and 6B are cross-sectional views of other embodiments of this invention.

DESCRIPTION OF PREFERRED EMBODIMENTS

Figure 1:
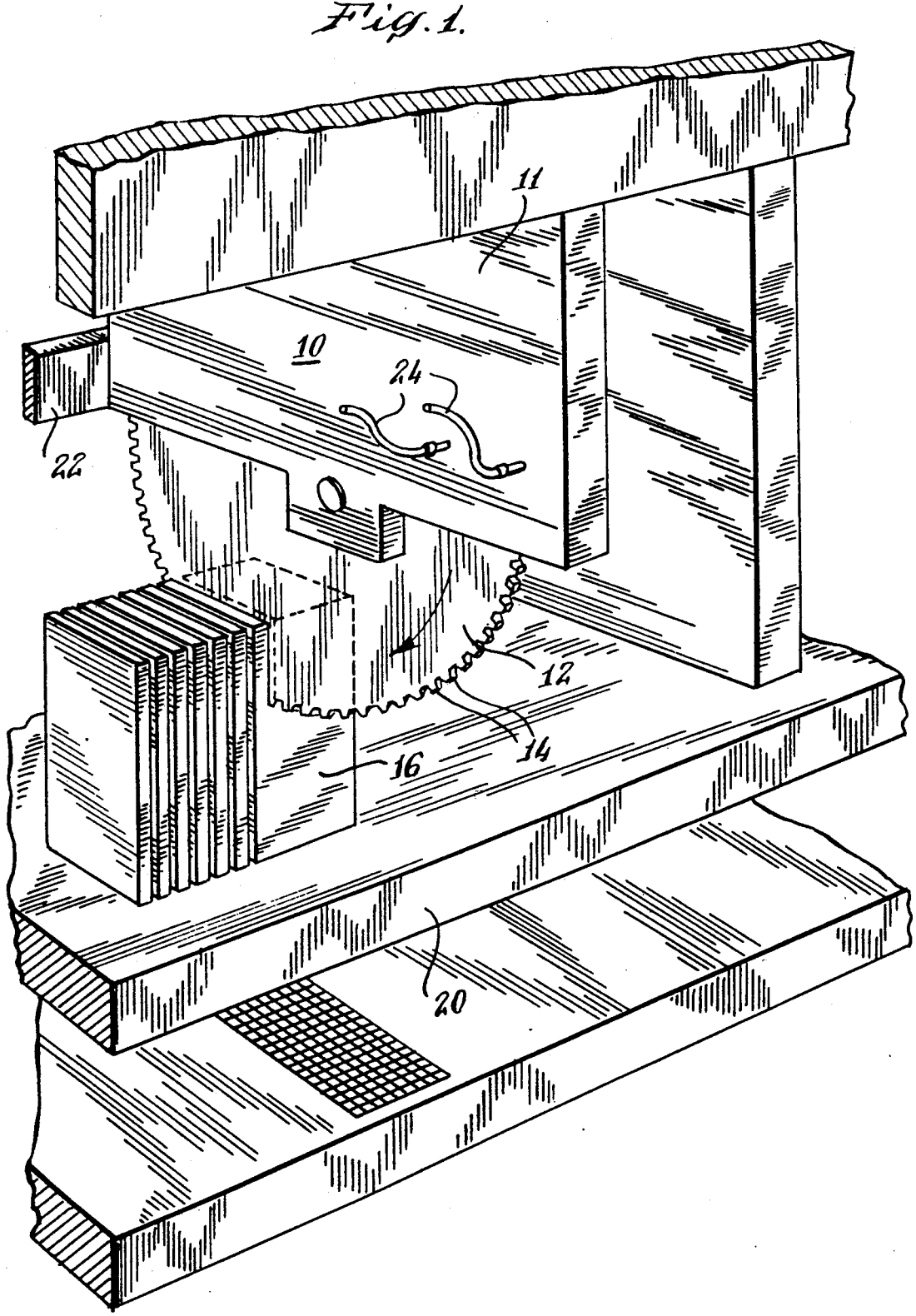
FIG. 1 is a perspective view of a circular saw device in which embodiments of this invention may be utilized.

Referring first to FIG. 1, there is depicted a stone cutting apparatus 10 of known per se design and structure. It includes a motor driven circular saw blade 12 that is mounted in a protective housing 11 that usually includes sources 24 which supply jets of water for cooling and debris removal purposes (not shown). By means of appropriate gearing, power adjustment, or other known per se means, the speed of the drive motor may be varied within established limits. The block of stone 16 from which slabs are to be cut, sits on a table 20 which may reciprocate to cause the saw blade to move forward and backward relative to the stone. Alternatively and/or additionally, the saw apparatus itself may be reciprocally moveable with respect to the stone block, as this can involve moving less mass than might moving the stone itself.

As shown in FIG. 1, the depicted circular blade 12 includes a series of teeth 14, the top surface of each of which provides abrasive cutting material. It is to be understood that as used in this disclosure and accompanying claims, terms of relative orientation, such as "top", "bottom", "front", "back", etc. are intended to be interpreted from the standpoint of a view taken from one side of a "core" (as hereinbefore defined) of a point on the periphery of that core when that point is vertical to the axis about which the core turns, with the "front" being the direction of travel of the core when it is in use. Thus, "up" and "top" connote the direction of a core radius which extends vertically from the core's axis of rotation, "front" connotes the normal direction of rotation of the core at the "top" position (and "rear" the opposite direction), and "side" connotes directions which are at right angles to the plane of rotation of the core.

A point to be kept in mind is that the way in which such saws work is to be distinguished from circular saws used in other contexts, such as cutting wood, where the cutting operation is by shearing or chipping removal through action of the edges of the teeth. With very hard materials, the cutting action is one of abrasion by the top surface of the teeth in progressively deeper sweeps along the cutting line into the substance of the material to be cut. Further, while there may be some options as to the range of blade speeds, such apparatus currently operates with a peripheral saw speed range of 4500 to 9000 ft./min.. Also, because of the size of the apparatus, there may be limits to the extent to which the diameter of the blade used in a given machine may be increased, thus limiting increases in speed of the effective cutting surfaces as a function of the diameter of the blade used within a given speed range.

Although materials such as carbide may sometimes be used to provide the abrasive cutting surface where comparatively soft stone is to be cut, it is usual in cutting harder materials for diamond dust or pieces to be used for that purpose. Such material may be imbedded in or otherwise incorporated into a matrix of bronze, cobalt, nickel, tungsten or other metal or other materials such as epoxies, to be affixed to a base member to be bonded to selected locations along the periphery of the associated core. The comparative difficulties of handling such blades, large and heavy as they are, the random patterns of wear as between teeth, and the sever ambient conditions to which they are subjected, have, as previously noted, led to various means for refurbishing these surfaces individually which have not been satisfactory.

Turning then to FIGS. 2A trough 2C, there is depicted a cutting member mount or extender 30 designed for installation on a circular saw blade core. While the core used may be or may have been for use to create a circular saw blade, it is within the contemplation of this invention that the base or core upon to which embodiments of this invention may be affixed typically will take the form of such a core, or of a circular mounting core as such, designed expressly for that purpose and/or for use in connection with embodiments of this invention. Thus, in this context, the term "core" is intended to mean any structure suitable for use as a base upon which the extenders contemplated by this invention may be positioned.

The extender mount 30 includes vertical sidewalls 32, 34 that are retained in spaced apart relationship with respect to each other by means of a bottom separator portion 36 and a top separator portion 38.

One or all of the various elements which comprise embodiments of this invention, for example the sidewalls, the separator portions, and the tab hereinafter described, may be formed in a variety of known per se ways. For example, they may be formed as part of an investment casting and structured as integral parts of all or part of the entire structure as shown in FIGS. 2A through 6B. However, embodiments of this invention may be formed by other means as well, as by laminating slabs of material, such as steel plate or strip, and bonding them to each other by known per se means, such as welding or brazing. The advantages of these alternatives are comparative ease and facility of construction as compared with other means which also may be used to achieve comparable results, such as the machining out of cavities and surfaces. Whatever the exact means utilized, in the resulting structure as described, the top separator portion 38 and the bottom separator portion 36 are separated vertically from each other by a space which extends between the sidewalls 32, 34 all the way through the mount or extender, from front through back. As shown particularly in FIGS. 2A, 2C, 4A and 5A, the top surface 40 of the bottom separator portion 36 (i.e., the surface 40) which also forms the bottom of the aperture described by the separators and the sidewalls, slopes downward in the direction of the front of the extender. By this means, when the extender is mounted in operating position on a core and is oriented with the surface 40 sloping downward in the "front" direction, the surface 40 will collide with water that is being sprayed on the apparatus during cutting operations as a coolant and for debris removal. This will cause that water to produce a dynamic spray effect and to spray onto other, succeeding teeth, mounts and other components of the cutting device. This enhances cooling and debris removal, not only of that particular mount, but also importantly, subsequently following apparatus, particularly other such mounts, with which the water then comes into contact. The front of the top separator portion 38 preferably is set back from the front edges of the vertical wall members 32, 34, and down from their tops. This provides recesses into which a cutting member 50 will fit as it is slideably installed upon the top separator 38 as hereinafter described.

As shown in the accompanying drawings, the lower end of the mount 30 also includes a tab 42 which extends all the way across the the base of the mount 30 from one side to the other. The tab may be formed integrally with all or part of the rest of the structure, or may be added to it as a separate element, using any appropriate means, including those previously discussed. The bottom of the extender or mount device, in the region of the base ends of the vertical walls 32, 34 and of the bottom of the separator portion 36, may be bonded to portions of the associated core, such as atop the the gullet-spaced "lands" that normally are provided to mount the diamond-bearing matrix blocks or other tooth elements on a circular saw core, by welding, brazing, silver soldering, or other known per se means. The extenders may be adapted to straddle the tops of such adjacent "lands" as well as the gullets separating them or other peripheral surface features of the associated circular base core, optionally with a tab 42 abutting the rearward wall of the "land" or other surface feature as shown and described. The bonding means used may be sufficient to provide structural integrity against the dynamic forces which, in use, may tend to break the mount off of its associated core. However, when a reinforcing element is used and so positioned, it provides even greater structural integrity and strength by adding its sheer strength to the other means which also resist disintegration.

FIGS. 3A through 3C depict, respectively, side, rear and front views of a cutting member base 50 which may be used in the practice of this invention, particularly with embodiments as shown and described in FIGS. 2A through 2C, and 4A through 6B. In FIGS. 3A through 3C, the cutting member base 50 is in the form of a slotted, U-shaped member. It includes a vertically downward oriented top rib 52 that is separated by a space 53 from a vertically upward oriented bottom rib 54. The ribs 52, 54 are continuous with a vertically oriented end rib 51. The slot 53 is made to correspond in dimensions and shape to the bottom, front and top surfaces of the top separator 38 of an associated mount of the type shown in FIGS. 2A through 2C, 4A and 5A. The cutting member base 50 may then be installed upon such a mount separator by positioning the ribs 51, 52, 53 of the cutting member 50 in the recesses formed between the vertical wall portions 32, 34 of the mount, and sliding it toward the rear of the mount. Correspondingly, it may be removed by sliding it forward in the opposite direction. It may also be seen from FIGS. 3A through 3C, that the cutting member 50 as depicted includes a front portion 56 which is at right angles to the previously described rib 51, and a top portion 58 which similarly is at right angles to the top rib 52. These front and top portions 56, 58 may be formed integrally with the rest of the structure, or attached by known per se means, such as welding, brazing or the like. Preferably, each of the top portions 56, 58 is of such width and the top rib 52 and the end rib 51 each are of such thickness that when the cutter is installed upon its associated mount as hereinafter described, the tops and ends respectively of the vertical wall members (i.e., 32, 34) will be covered by the top and front portions 58, 56, of the cutting element base 50, and the ribs 51, 52 will substantially occupy the lateral dimension of the previously described recesses formed by the tops and fronts of the vertical wall members 32, 34 and their associated top separator 38 to restrict the cutting member from moving laterally with respect to the mount. It is also to be noted that the horizontal length of the cutting element base 50 is sufficiently great to enable the slot 53 to be comparatively deep. By this means, and designing the mount to which it is to be affixed of corresponding horizontal dimension, horizontal stability may be imparted to the base 50 against "chattering" or other instability. Preferably prior to such installation, the top surface 60 may have affixed to it block of matrix or other material bearing diamond dust or other cutting material thus providing the actual abrasive cutting surface in such embodiments of this invention. Of course, some or all of the outer surface of the front portion 56 may be similarly treated, as desired in order to enhance the operation of such devices.

FIGS. 4A and 4B illustrate the embodiments of this invention shown in FIGS. 2A through 3C in use together. As depicted, the extender 30 has been affixed to the peripheral surface of the core 20 by having its base welded, brazed or otherwise bonded to the tops of the core "lands" 24A, 24B, with the bottom of the extender 30 straddling the "lands" 24 and bridging the gullet 22 which separates the lands, and with its reinforcing tab 42 abutting the rearwardmost land 24B. The cutting member base 50 to which diamond abrasive bearing matrix blocks 70 have previously been affixed, has been slid into position with its U-shaped receiving slot 53 positioned about the top separator member 38 of the extender 30. In this posture, comparable structures having been installed about the balance of the periphery of the core 20, the unit is equipped to be used as a rotary stone saw, turning toward the "front" or clockwise direction illustrated by the arrow shown in FIG. 4A. When necessary because of wear or breakage, or when desired as, for example, when a different cutting task is presented that requires an alternate cutting surface to be used, the cutting base mount may be removed simply by driving it, as with a hammer, toward the "front" direction. In the meantime, the interrelationship of parts, reacting to the dynamic forces of cutting, ensures that the cutting surfaces presented will remain positionally stable and effective.

In FIG. 5A through 6B, items 112 through 152 correspond in function, construction and position to those previously discussed except in these Figures, they have been given the prefix "1—" (i.e., "140" in FIGS. 5A and 5B corresponds to previously discussed "40", etc.). However, this embodiment is directed toward a core 120 that is especially made for use with extenders of the type herein disclosed, rather than being an adaptation of what is basically a normal, standard saw blade core as such. Thus, as will be seen more particularly from FIG. 5B, the core 120 has a peripheral groove 110 cut in it to receive a continuous, circular tab 108 that has been formed as an extension of the base part of extender 112. To assist in anchoring this assembly in place, holes 104 are shown to have been positioned in the portions of the core 120 that form the rim-like flanges on each side of the receptacle groove 110. By this means, as is more clearly shown in FIGS. 6A and 6B, supplementary anchoring means may be utilized to fix the extender securely in place at the periphery of the core. Thus, in FIG. 6A, a rivet 106A is shown as having been inserted through the hole 104 and through a corresponding hole 104A that has been prepared in the anchoring rim 108 of the extender for that purpose, and the rivet has then been formed in the usual fashion. An alternative is illustrated in FIG. 6B, where plug welds 106B are shown to have been used for the purpose of anchoring the extender in place on its associated core. This approach, of course, may produce some heating of the base of the extender, but not of sufficient magnitude normally to present any difficulty. Correspondingly, an advantage of this latter approach is that it may be utilized without having to create or align corresponding holes in the base tab on the extender. Of course, these, as well as other methods and structures, may be used as is appropriate with other embodiments of this invention, including (without limitation) those previously illustrated and discussed herein.

Several advantageous effects result from using mounts according to this invention. A principal advantage is that this can reduce radically the cost of cutting for several reasons. First, existing circular blades, including those which have been used and consequently have become worn, even to such an extent as to no longer to be usable, may be refurbished with reduced cost and effort, and without derogation of the blade itself. It has been proposed to provide replacement cutting surfaces which are to be attached to the associated core by welding, brazing or other heat implemented means. However, the degree and extent of such heating cannot, as a practical matter, be closely enough regulated to preserved the properties of the blades, which typically are made from material that is hard, brittle and highly susceptible to change. The result is non-uniformity of the internal stresses and other variations in physical properties which adversely affect the ability of the blade to preserve its alignment, integrity and strength. Such adverse results are avoided with the present invention since, except in the rare event when a cataclysmic event such as a break occurs, only a single heating process, which it is technically and economically feasible to control closely since it need be done only once, is necessary in order to make the original attachment of the original amount. Thereafter completion of the installation is achieved by the simple process of replacing the cutting member by sliding it into position.

Further, the advantage aside of avoiding heat trauma to the base core, the replacement of a cutting member itself is also comparatively simple since it involves no further heating or bonding of the core or the cutting member in order to position the latter for use. Instead, one needs only to use a hammer or mallet to drive the otherwise positionally stable cutting member forward out of its seat on the top separator portion of the mount to slid it out of position so that a replacement cutting member can be slid into the location that the spent one had occupied. This means, too, that versatility in cutting surfaces is also further accommodated with the same basic installation, since, to change the cutting characteristics, one need not even replace the blade or bond new cutting surfaces to an existing blade. Thus, if a coarser or finer or differently dimensioned or shaped cutting surface is required, the cutting member may be merely replaced as in the case of a refurbishment.

A further advantage is that because the replaceable cutting members are stronger and therefore more stable than those used heretofore, they may be used a number of times before being finally disposed of.

Another advantage is that with this invention, particularly where extenders may be added which bridge more than one underlying tooth mounts, the cutting surface appears to be rendered more stable positionally against lateral throw or wobbling. As a result, the cuts made are cleaner and more precise. Without intending to be bound by any theory, it is conjectured that the addition of the extenders to the periphery of the core and/or the optional joining of two or more tooth mounts to each other by the addition of extenders may reinforce the core and thus stabilize it to a greater extent than would otherwise be the case. Another benefit of this stabilization effect is that the use of additional material, with its consequent high cost for added expensive core stock and the added difficulties of handling and processing it, may be ameliorated.

Yet another advantage of this invention is that within such other physical parameters as may obtain in the cutting environment (e.g., size limitations imposed by clearances in the machine that are not otherwise avoidable), this invention also enables smaller cores to be adapted to the uses in which larger cores normally are used. This is because an effect of the aggregation of mounts on a given core is effectively to increase the diameter of the resulting cutting device. For example, it may therefore be possible to cut larger pieces without the use of a larger diameter blade per se. This result may be further enhanced by the previously mentioned apparent improved stabilization which occurs as a result of the mounts having been added to the periphery of the core, thus rendering stable cores that otherwise would become unstable as a result of an increase in diameter.

Still another advantage of this invention, is that in the event of breakage of any individual mount, that may be removed and replaced without loss of the entire core as might be the case if the cutting surface were bonded to the core itself, as with a traditional saw blade. In addition, the height of the extender makes the cutting member more readily accessible for replacement than would be the case if the cutting member were mounted close to or on an integral part of the core itself.

Enhanced dispersion of cooling/cleaning water is induced by the ramped floor of the slot between the vertical side members of mounts according to this invention. The result is advantageous in and of itself, as well as in the context of one or more among the foregoing features, since the effectiveness of the cutting surfaces which actually do the cutting may thereby be significantly enhanced. It is also to be expected that by virtue of the reduced temperatures of operation and the improved cleaning and debris removal effects, the longevity of cutting devices according to this invention will be significantly greater.

Relative to all of the foregoing advantages, a major operative factor is the previously noted fact that circular cutting blades for hard materials such as stone are very expensive, and the additional fact that increases in costs for them are disproportionately large with each incremental increase in diameter. This invention is especially advantageous in enabling the use of smaller cores to the same effect and efficiency as larger ones, but with materially lower costs. For all of these reasons, with the present invention, cutting costs per unit of work may be significantly lowered and the quality of cut products improved.

Other beneficial effects which may be realized include increases in the efficiency, costs, and performance of cutting surfaces and in cutting speeds, ready and individual replaceability, ease and low expense in refurbishing cutting surfaces, and ready adaptability to existing machinery.

It is to be understood although preferred embodiments of this invention and their constituent elements have been variously shown and described, it will be within the capability of knowledgeable persons to carry out this invention in other embodiments and constituents thereof. Thus, for example although the sidewalls herein described and shown as being substantially planar, the separator elements as single solid pieces, and the floor of the aperture between the sidewalls as substantially a flat inclined plane, other structures, contours, sizes and shapes may be used that will achieve substantially comparable results in terms of the utilization of this invention. Thus, it is to be understood that the embodiments of this invention herein described and depicted are by way of illustration and not of limitation, and that a wide variety of embodiments may be made within the spirit and scope of this invention.

We claim:

1. Apparatus for use with a saw core comprising an extender
    that includes sidewall members having inner surfaces which are retained in side by side and spaced-apart relationship with respect to each other by means of a first separator portion located in the vicinity of a first end of said extender and of a second separator portion located in the vicinity of a second end of said extender which second separator portion is located at the opposite end of said extender from said first end, and
    that includes a cavity internal of said extender that is bounded at its sides, top and bottom respectively by said inner surfaces of said sidewall members and said first and second separator portions, and includes openings from said cavity to the outside in those regions not occupied by said sidewalls and said separator portions, said first separator portion being adapted to slideably receive a cutting member base from the direction of one of said openings and positionally retain said base thereon, and said sidewall members being so dimensioned that when the cutting member base to be positioned on said first separator portion is so positioned, at least part of said cavity and said openings are not occupied by said cutting member base, and
    that is adapted to be affixed at said first end to a saw core with said openings extending outward past the peripheral edge surface of said core in the direction of an extension of radii of said core and with the opening into said extender in the direction from which first separator is adapted to so receive said cutting member base facing in the direction in which the core is to turn when in use.

2. The apparatus described in claim 1 wherein said cutting member that said first separator portion is adapted to receive is U shaped in cross-section.

3. The apparatus described in claim 1 wherein the means by which said first separator portion is adapted to slideably receive said cutting member base includes the surfaces of said first separator portion being recessed from the edges of said sidewalls that are farthest from the extreme of said extender that is adapted to be affixed to said core and from the edges adjacent thereto which face in said direction.

4. The apparatus described in claim 1 wherein the means by which said first separator portion is adapted to slideably receive said cutting member base includes the surfaces of said first separator portion being recessed from the edges of said sidewalls that are farthest from the extreme of said extender that is adapted to be affixed to said core and from the edges adjacent thereto which face in said direction.

5. The device described in claim 1 wherein, when said device is affixed to a saw core in the manner for which it is adapted to be so affixed, the surface of said second separator portion is so configured that the end of said surface that faces in said direction will be closer to the axis of said core than will be its opposite end.

6. The device described in claim 1 wherein, when said device is affixed to a saw core in the manner for which it is adapted to be so affixed, the surface of said second separator portion is so configured that the end of said surface that faces in said direction will be closer to the axis of said core than will be its opposite end.

7. The device described in claim 1 wherein, when said device is affixed to a saw core in the manner for which it is adapted to be so affixed, the surface of said second separator portion is so configured that the end of said surface that faces in said direction will be closer to the axis of said core than will be its opposite end.

8. The device described in claim 1 wherein, when said device is affixed to a saw core in the manner for which it is adapted to be so affixed, the surface of said second separator portion is so configured that the end of said surface that faces in said direction will be closer to the axis of said core than will be its opposite end.

9. The apparatus described in claim 1 wherein the means by which said base end is adapted for affixation to said core includes a tab for positioning in a receiving aperture in said core.

10. The apparatus described in claim 2 wherein the means by which said base end is adapted for affixation to said core includes a tab for positioning in a receiving aperture in said core.

11. The apparatus described in claim 3 wherein the means by which said base end is adapted for affixation to said core includes a tab for positioning in a receiving aperture in said core.

12. The apparatus described in claim 4 wherein the means by which said base end is adapted for affixation to said core includes a tab for positioning in a receiving aperture in said core.

13. The apparatus described in claim 5 wherein the means by which said base end is adapted for affixation to said core includes a tab for positioning in a receiving aperture in said core.

14. The apparatus described in claim 6 wherein the means by which said base end is adapted for affixation to said core includes a tab for positioning in a receiving aperture in said core.

15. The apparatus described in claim 7 wherein the means by which said base end is adapted for affixation to said core includes a tab for positioning in a receiving aperture in said core.

16. The apparatus described in claim 8 wherein the means by which said base end is adapted for affixation to said core includes a tab for positioning in a receiving aperture in said core.

17. Apparatus for use with circular saw cores comprising an extender which includes sidewalls of substantially corresponding dimensions and shapes the are side by side and spaced apart from each other, corresponding end of said sidewalls forming a base end of said extender that is adapted for affixation at the peripheral surface of a circular saw core, with the space between said sidewalls opening in the direction in which said core is to rotate when it is in use and away from said direction, a first separator portion which extends between said sidewalls in the region of the ends thereof farthest from said base end and is adapted to slideably receive a support slot in a cutting member base thereon from said direction, a second separator portion which extends between said sidewalls in the region of said base end and is so contoured that when said extender is affixed to said core in the manner for which it is adapted as aforesaid, it slopes progressively away from said first separator in said direction, and and a cutting member base, having a U shaped support slot, positioned on said first separator portion, said support slot on said cutting member base and said first separator being of such cooperative dimensions and shapes as to slideably receive an retain said base on said separator substantially movement free said sidewall members being so dimensioned that when the cutting member base is so positioned, at least part of said cavity and said openings are not occupied by said cutting member base.

18. The apparatus described in claim 17 wherein the means by which said first separator portion is adapted to receive said support slot of said cutting member base includes recesses in said first separator portion with respect to the outer surfaces of said extender that are farthest from said base end.

19. The apparatus described in claim 17 wherein the means by which said base end is adapted for affixation to the peripheral surface of a circular core includes a tab for insertion into a receiving aperture in said peripheral surface to abut against at least one surface thereof.

20. The apparatus described in claim 18 wherein the means by which said base end is adapted for affixation to the peripheral surface of a circular core includes a tab for insertion into a receiving aperture in said peripheral surface to abut against at least one surface thereof.

* * * * *